May 20, 1924.

G. W. BOWMAN

HEDGE CUTTER

Filed April 13, 1923

1,494,336

INVENTOR
George W. Bowman
By Kay Totten Bowman
attys

Patented May 20, 1924.

1,494,336

UNITED STATES PATENT OFFICE.

GEORGE W. BOWMAN, OF TARENTUM, PENNSYLVANIA.

HEDGE CUTTER.

Application filed April 13, 1923. Serial No. 631,823.

*To all whom it may concern:*

Be it known that I, GEORGE W. BOWMAN, a citizen of the United States, and resident of Tarentum, in the county of Allegheny and State of Pennsylvania, have invented a new and useful Improvement in Hedge Cutters; and I do hereby declare the following to be a full, clear, and exact description thereof.

My invention relates to hedge cutters or trimmers, although not necessarily limited to such use, as its application may be further extended.

The object of my invention is to provide a cutter of this character which is strong and durable and of such simple construction that it is not liable to get out of order. To these ends my invention consists, generally stated, in a cutter comprising two juxtaposed cutter bars each having at one end an arc-shaped slot and an inwardly extending lug at said slot, and an aperture at the other end, handles pivoted to said lugs and connecting devices passing through said slots and said apertures to connect the innermost end of said handles to the opposite bars, whereby as said handles are moved simultaneously toward and from each other the knives of the cutter bars will overlap to do the cutting.

Figure 1:
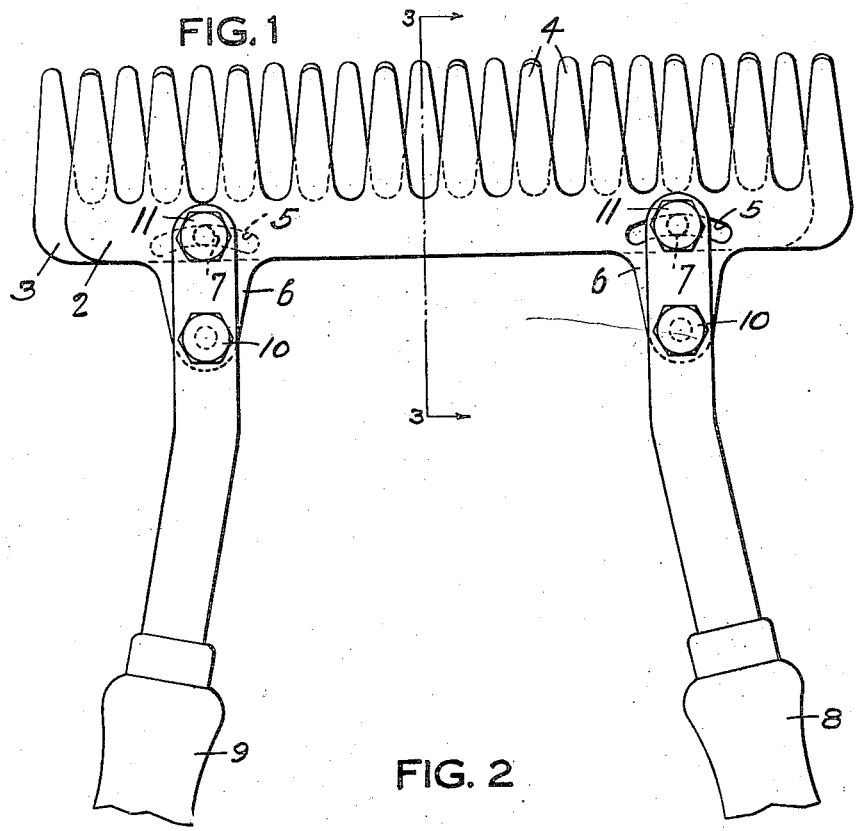
Figure 2:
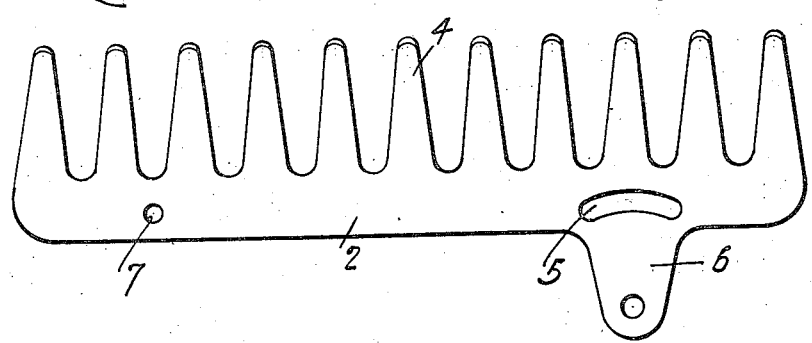
Figure 3:
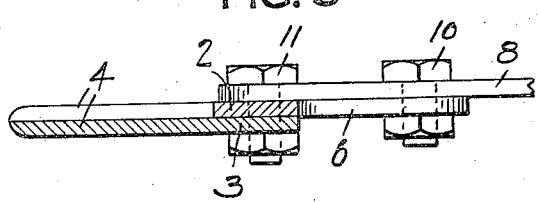

In the accompanying drawing Fig. 1 is a plan view partly broken away of my improved cutter; Fig. 2 is a like view with one of the cutters removed; Fig. 3 is a section on the line 3—3, Fig. 1.

The numeral 2 designates one cutter bar and 3 the other provided with the knives 4. Each cutter bar has at one end the arc-shaped slot 5, and at said slot is located the inwardly extending lug 6. At the other end each cutter bar has the aperture 7.

The handles 8 and 9 are provided, each handle being pivoted by the bolt 10 the lug 6 of its cutter bar. The innermost end of each handle is connected to the opposite cutter bar by the bolt 11 which passes through the slot 5, and the aperture 7 in the juxtaposed cutter bar, i. e. the handle 8 is pivoted to the lug 6 of the cutter bar 2, and the bolt 11 passes through the slot 5 of the cutter bar 2 and through the aperture of the opposed cutter bar 3 while the handle 9 is pivoted to the lug 6 of the cutter bar 3 and the bolt 11 passes through the slot 5 of the cutter bar 3 and through the apertures 7 of the cutter bar 2.

In this manner provision is made for the sliding of one cutter bar over the other in opposite directions by the simultaneous movement of the handles toward and from each other. The handles diverge slightly from the pivotal points, so that greater leverage is obtained and less movement of the handles is required.

The cutter is composed of a minimum number of parts, and is strong and durable to withstand the severe usage to which said cutter bars are subjected.

What I claim is:

1. In a cutter of the character described, the combination of two juxtaposed cutter bars provided with knives, arc shaped slots formed at one of the ends of each cutter bar, apertures formed in the opposite ends of said cutter bars, inwardly extended lugs at said slots, handles pivotally connected to said lugs, and fastening devices passing through the innermost ends of said handles through said slots and apertures.

2. In a cutter of the character described, the combination of two juxtaposed cutter bars provided with cutting knives, arc shaped slots formed at one of the ends of each cutter bar, inwardly extending lugs at said slots, apertures formed at the other ends of said cutter bars, handles pivotally connected to said lugs, fastening devices passing through the innermost ends of said handles and through said apertures and slots, said handles diverging from a point beyond the pivotal points.

In testimony whereof I, the said GEORGE W. BOWMAN, have hereunto set my hand.

GEORGE W. BOWMAN.